July 13, 1965 R. C. VANDERMARK ETAL 3,195,027
TERMINAL LEAD CONNECTION AND METHOD OF MAKING SAME
Filed April 27, 1962
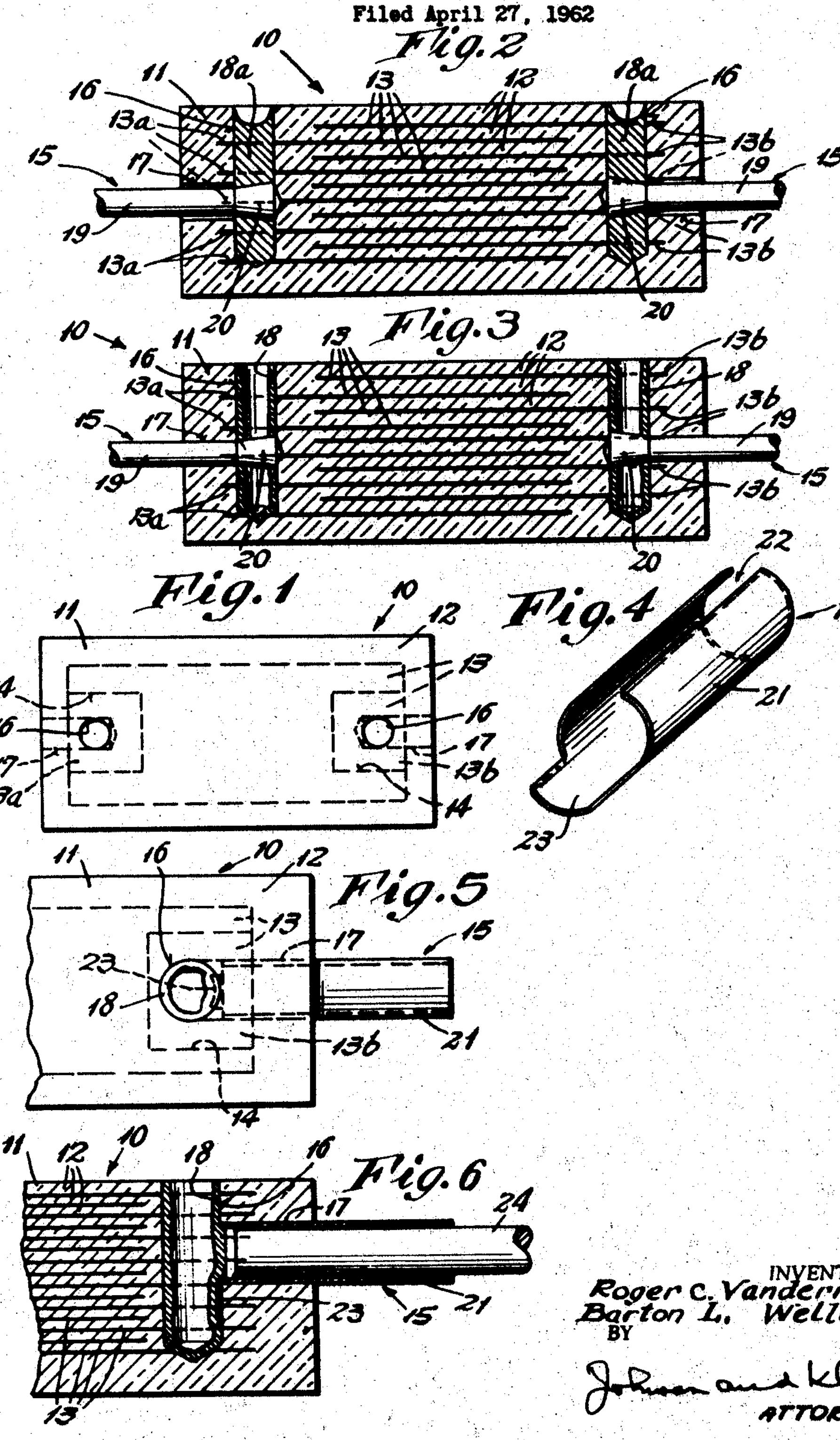
INVENTORS
Roger C. Vandermark
Barton L. Weller
BY
Johnson and Kline
ATTORNEYS United States Patent Office 3,195,027

Patented July 13, 1965

3,195,027

TERMINAL LEAD CONNECTION AND METHOD OF MAKING SAME

Roger C. Vandermark, Sandy Hook, and Barton L. Weller, Monroe, Conn., assignors to Vitramon, Incorporated, Monroe, Conn., a corporation of Delaware Filed Apr. 27, 1962, Ser. No. 190,627
12 Claims. (Cl. 317—242)

This invention relates to terminal lead connections for electrical units and to a method of making the same. More specifically, it pertains to terminal lead connections for use in capacitors, resistors, inductors and similar devices having electrodes and including a body of ceramic, vitreous, organic or other materials requiring a final curing or sintering operation, wherein the electrodes lie wholly within the body of the device thus creating a difficult problem of lead connection.

In making a terminal lead connection in such an electrical unit, the purpose of which is to provide means for connecting the unit into a circuit, problems have been encountered where the electrodes of the unit lie wholly within its body since such location often makes it difficult to achieve mechanical lead strength and electrical continuity between the lead and the electrode. Also, in certain electrical devices, such as, for example, capacitors, where the individual electrodes each comprise a plurality of plates or the like, there is the problem of electrically tying the plates together so that the lead has electrical contact with all of them in the form of a unitary electrode.

One attempt that has been made to overcome the problems in making a terminal lead connection in ceramic, vitreous, organic or other electrical units, which are of the type requiring a final curing operation and have their electrodes lying wholly within the body of the unit, is disclosed in the United States patent of Barton L. Weller No. 3,021,589. This method comprises inserting a lead wire into the body of the unit, which is a laminate, transversely to the layers forming the body so that the wire has electrical contact with the desired electrode and is gripped and retained by the body, which is shrunk thereon during the curing operation. According to this method, insertion of the lead wire is achieved by forming a recess in the body transversely of the layers and through the desired electrode, the recess being of a size to receive the lead wire before the body is cured and grip the same after curing.

The method disclosed in Patent No. 3,021,589, in addition to enabling a terminal lead connection to be made with electrodes lying wholly within a body, also facilitates connection of a plurality of plates or the like within the body to form a single electrode. According to the method such connection is achieved by lining the recess with electrically conductive material, which engages all of the plates forming the desired electrode, prior to insertion of the lead wire into the recess so that the wire electrically engages the plates through the lining.

While the method disclosed in the aforenoted patent provided the solution to many of the problems mentioned above, it has created additional problems which must also be solved. The insertion of the lead wire into the body prior to the curing operation is a limiting factor on the type of lead that can be used since not all lead wire can withstand the firing temperatures necessary to many of the curing operations. Further, insertion of the lead into a recess of the character necessary to facilitate anchoring of the lead, is often difficult due to the piston effect which resists complete seating of the lead, and may result in a reduction in the mechanical strength of the connection and electrical discontinuity. Similarly, in those constructions requiring an electrically conductive lining to connect the plates forming the electrode, the insertion of the lead may wipe the lining from portions of the wall of the recess thereby dropping one or more of the plates from the electrode.

The present invention overcomes the problems inherent in making a terminal lead connection in an electrical unit having a sintered, shrinkable body wherein the electrodes are disposed within the body and, further, provides the solution to the problems presented by the method of Patent No. 3,021,589.

It is, according, an important object of the invention to provide a method for making a terminal lead connection, with electrodes lying wholly within a ceramic, vitreous or other sintered body, which is mechanically strong and electrically reliable.

It is also an object of the invention to provide a method for making a terminal lead connection in an electrical unit which facilitates electrically tying a plurality of internal electrode parts, such as separate plates, together to form a single electrode of the electrical unit without a loss of mechanical lead strength or electrical reliability.

It is another object of the invention to provide an improved method for making a terminal lead connection in an electrical unit by inserting the lead into the body of the unit, which eliminates the piston effect of prior art methods and assures the electrical continuity of the connection.

Still another object of the invention is to provide a method of making a terminal lead connection to an electrode lying wholly within a ceramic, vitreous, organic or similar sintered body which utilizes the gripping characteristics of the cured body to maintain the terminal lead in position yet enables lead wires of any desirable character to be utilized.

According to the present invention, the aforenoted objects are achieved by providing electrically conductive means, which extend into the body transversely of the layers forming the same for engagement with the electrode, and terminal lead means extending into the body parallel to the layers for engagement with the electrically conductive means, the terminal lead means being adapted to interlock with the body when the latter is cured for preventing its accidental displacement.

In the preferred form of the invention, a recess is formed in the body, which is in its "green" or uncured state, for receiving the electrically conductive means. The electrically conductive means, which is preferably a lining of electrically conductive material on the wall of the recess, engages the electrode or, in the case of a multi-plate electrode or the like, engages all of the plates to electrically tie them together to form the electrode. A second recess is formed, also while the body is in the uncured state, that extends into the body parallel to the layers and opens into the first recess, this second recess being adapted to receive the terminal lead means that engages the electrically conductive means and electrically communicates the electrode outwardly of the body. In accordance with the invention the terminal lead means may be a lead wire having an upset inner end for interlocking with the body when it shrinks during the curing operation or may comprise a sleeve or the like, provided with interlocking means, adapted to receive any desired lead wire after the terminal lead connection is made.

Another important object of the present invention is to provide an electrical unit, having a body comprised of a plurality of substantially parallel superposed layers, including at least two electrically conductive layers lying wholly within the body and forming opposed electrodes, in which there is a terminal means for each electrode including a terminal lead means extending into the body substantially parallel to the layers for electrically communicating the electrode outwardly of the body, the terminal lead means having means for interlocking with the body when the latter is cured and shrunk thereon.

It is another object of the invention to provide an electrical unit having a laminated body including at least two electrodes lying wholly within the body, each electrode including a plurality of spaced electrically conductive layers, in which there is a terminal means for each electrode including means extending into the body transversely of the layers for electrically connecting all of the layers forming the electrode and a terminal lead means extending into the body parallel to the layers and interlocking with the body for engaging the connecting means to electrically communicate the electrode outwardly of the body.

It is further an object of the invention to provide an electrical unit of the ceramic, vitreous, organic or similar type, which requires a final curing operation and has electrodes disposed wholly within the body of the device, in which there are terminal lead connections for each electrode that are formed prior to the curing operation and are adapted to receive lead wires after the curing operation.

It is still further an object of the invention to provide a capacitor unit in accordance with the invention and a method of making the same.

Other objects and advantages of the invention will be apparent from the specification and claims when considered in connection with the attached sheet of drawings, illustrating one form of the invention, wherein like characters represent like parts and in which:

FIGURE 1 is a plan view of a capacitor unit, according to the invention, showing in solid and dotted lines the construction just prior to insertion of the terminal lead means;

FIG. 2 is an elevational view, in section, showing the capacitor unit of FIG. 1 with the terminal lead means in position prior to the curing of the body;

FIG. 3 is similar to FIG. 2 but shows the construction after the body is cured;

FIG. 4 is a perspective view of another form of terminal lead means;

FIG. 5 is a plan view showing the terminal lead means of FIG. 4 in position in the capacitor unit of FIG. 1; and FIG. 6 is a fragmentary elevational view, in section, of the capacitor unit of FIG. 5.

Referring now to the drawings for a more detailed description of the invention, in FIGS. 1 to 3 an electrical unit 10 is shown at various stages in the formation of a terminal lead connection according to the invention. While the concepts of the invention are applicable to capacitors, resistors, inductors and similar electrical devices having a ceramic, vitreous, organic or other body requiring a final curing operation and in which the electrodes lie wholly within the body, in the herein illustrated form of the invention, for purposes of description, a capacitor of the type disclosed in United States Patent No. 3,021,589 is shown.

Reference may be made to the said patent for particular details of construction of the capacitor, however, for present purposes it is sufficient to note that it comprises a body or laminate 11 of superposed substantially parallel layers of dielectric material 12 and electrically conductive material 13, the latter forming the electrode plates of the unit and lying wholly within the body. While in some instances it may be desired to have additional electrode plates on the exterior of the body and connected to the internal plates, it is presently preferred and herein illustrated as having all of the electrode plates disposed wholly within the body.

The method of making the body 11 of capacitor unit 10 forms no part of the present invention, however, it is essential to the invention for reasons to be hereinafter explained, that it be made in such a manner and of such material as to require a final curing operation.

The electrically conductive layers or plates 13 of body 11 are, as is well understood in the art, spaced by a layer or layers of the dielectric material 12 and so formed as to define two electrically distinct groups of electrode plates **13*a* and 13*b*. The groups of electrode plates, which each form one electrode of the capacitor unit and may be formed by relatively displacing adjacent plates so that alternate plates overlie one another, are here formed by providing a cutout 14** at the opposite ends of the adjacent plates so that the cutouts of alternate plates are in corresponding positions to facilitate electrically connecting all of the plates of each group to form its respective electrode.

According to the invention, terminal lead connections are made in the electrical unit 10 with each of the electrodes **13*a* and 13*b* of the unit by inserting a terminal lead means 15** into the body substantially parallel to the layers thereof for contacting its respective electrode and communicating it outwardly of the body.

In the illustrated form of the invention the terminal lead connection for each electrode is made by forming a first recess 16 in the body 11 transversely of the layers and passing through the respective electrode. In electrical units of the type shown in FIGS. 1 to 3 the first recess 16 is formed to pass through all of the plates 13 forming the particular electrode to which the connection is to be made. A second recess 17 is also formed in the body for each electrode to which a terminal lead connection is to be made, this second recess extending into the body substantially parallel to the layers forming the same and opening into its respective first recess 16. After the recesses 16 and 17 have been formed for each electrode in the electrical unit, electrically conductive means **18*a* are inserted into the first recesses 16 for electrically engaging their respective electrodes. While the electrically conductive means 18*a* may take any convenient form, it is preferably a lining 18 of electrically conductive material disposed, by any means known to the art, on the wall of the recess in engagement with the electrode. In the case of a multi-part electrode such as that shown in FIGS. 1 to 3, the lining engages all of the plates 13 forming the group 13*a* or 13*b* to electrically connect the plates and provide a unitary electrode. It should be noted, in connection with the electrically conductive means or lining 18**, that where additional external electrode plates are desired, as aforementioned, they can be conveniently electrically connected to the internal plates forming their respective electrode through the lining.

After the lining or other electrically conductive means has been inserted in the recess 16, the terminal lead means 15 is positioned in the recess 17 to extend into the recess 16 and electrically contact the lining. In the form of the invention shown in FIGS. 1 to 3 the terminal lead means 15 comprises a lead wire 19 having an upset inner end 20, for a purpose to be hereinafter explained, which is disposed in the first recess 16 for engagement with the lining 18. It is essential to the invention that the relative size of recess 17 and end 20 of lead member 15 be such as to barely permit passage of the upset inner end 20 through the recess before the body is cured.

After the terminal lead means is positioned in the recess, the body is cured, by a firing operation or the like, so that shrinkage of the body will cause the wall of recess 17 to grip the lead wire 19 and retain it in position. The enlarged inner end 20 of the terminal lead means interlocks with the body when the latter shrinks into gripping engagement with the lead wire 19 for further strengthening the connection and preventing accidental displacement of the terminal lead means.

It will be seen that by means of the above-described method the problems inherent in making a terminal lead connection to electrodes lying wholly within a ceramic, vitreous, organic or other sinterable body are eliminated and a unique connection is obtained which is mechanically strong and electrically reliable; the utilization of separate interconnecting recesses which extend into the body transversely to the layers and parallel thereto for receiving the electrically conductive means and terminal lead means, respectively, has eliminated the deleterious piston effect of prior methods and assured continuity of the electrical connection between plates and between the electrode and the terminal lead means.

Referring now to FIGS. 4 through 6, another form of the invention is shown which differs from that described with respect to FIGS. 1 to 3 only in the form of terminal lead means utilized. As illustrated, the terminal lead means 15 in this embodiment of the invention comprises an elongate cylindrical sleeve 21 of foil or other electrically conductive material. The sleeve, which is illustrated as being longitudinally split, as at 22, for a purpose to be hereinafter explained, but may be formed with a continuous unbroken wall is provided at its inner end with an integral longitudinally projecting tongue portion 23.

In accordance with the invention, as above-described, the sleeve 21 is inserted in the recess 17, before the body 11 is cured, so that the tongue portion 23 projects into the recess 16. After the sleeve is positioned as described, the tongue portion 23 is bent over, by any means known to the art, so that it engages the electrically conductive lining 18, as most clearly seen in FIG. 6, and interlocks with the body.

At this point it should be noted that the sleeve 21 and the recess 17, within which it is disposed, are of substantially the same diameter, only differing by an amount sufficient to permit insertion of the sleeve into the recess. After the terminal lead means 15 is positioned in the recess 17, the body 11 is cured by known methods and for reasons well understood in the art, such curing causing the body to shrink so that the walls of the recess 17 are gripped for retaining it in position. While the wall of the sleeve may be continuous and unbroken, it has been found that with high shrinkage bodies shrinking of the body into gripping engagement with the sleeve 21 is facilitated by the sleeve being longitudinally split so that it is readily compressed without buckling or otherwise deforming.

After curing the body 11 the electrical unit 10 is ready to have lead wires 24 connected to the terminal lead means and may be subjected to final test procedures and inventoried for shipment. It will be noted that the lead wires 24, which are connected to the terminal lead means by inserting them into the sleeves 21 and soldering or otherwise securing them in place, may be affixed before or after testing the unit, when removing the unit from inventory for shipment or by the ultimate user. Further, lead wires of any desired material or design may be utilized with the unit since the body is cured prior to lead connection, thereby eliminating undesirable restrictions on lead characteristics.

Thus, among others, the several objects and advantages of the invention as aforenoted are achieved. Obviously numerous changes in the structure may be resorted to without departing from the spirit of the invention as defined by the claims.

We claim:

1. In an electrical unit comprising a laminated body of parallel layers bonded together throughout their coextensive surfaces, said layers including at least two electrically conductive layers lying wholly within said body and a plurality of layers having different specific electrical characteristics, said electrically conductive layers being separated by at least one of said layers having said different specific electrical characteristics and forming two electrically distinct groups, and a terminal means for each group, said terminal means connecting all of the electrically conductive layers of one group to form an electrode of the electrical unit and electrically communicating the electrode outwardly of said body; the improvement in which at least one of said terminal means comprises electrically conductive means extending through at least some of said layers transversely thereto and spaced inwardly of the edges of said body for electrically connecting all of the electrically conductive layers of one group for forming one of the electrodes of the electrical unit and an electrically conductive terminal lead means having an upset inner end extending into said body substantially parallel to said layers and electrically connected to said electrically conductive means for communicating the electrode outwardly of the body, said body being shrunk upon said terminal lead means for gripping the same so that said upset inner end interlocks with said body.

2. The invention as defined in claim 1 in which said electrically conductive terminal lead means comprises an elongate tubular member extending into said body and having an integral tongue portion at the inner end thereof projecting outwardly of the periphery of said tubular member for interlocking with said body.

3. In a capacitor unit comprising a laminated body of parallel layers bonded together throughout their coextensive surfaces, said layers including a plurality of dielectric layers and at least two electrically conductive layers lying wholly within said body, said electrically conductive layers being separated by at least one of said dielectric layers and forming two electrically distinct groups of electrode plates, and a terminal means for each group, said terminal means connecting all of the electrode plates of one group to form an electrode of the capacitor unit and electrically communicating the electrode outwardly of said body; the improvement in which at least one of said terminal means comprises electrically conductive means extending through at least some of said layers transversely thereto and spaced inwardly of the edges of said body for electrically connecting all of the electrode plates of one group for forming one of the electrodes of the capacitor unit and an electrically conductive terminal lead means having an upset inner end extending into said body substantially parallel to said layers and electrically connected to said electrically conductive means for communicating the electrode outwardly of the body, said body being shrunk upon said terminal lead means for gripping the same so that said upset inner end interlocks with said body.

4. In a capacitor unit comprising a laminated body of parallel layers bonded together throughout their coextensive surfaces, said layers including a plurality of dielectric layers and at least two electrically conductive layers lying wholly within said body, said electrically conductive layers being separated by at least one of said dielectric layers and forming two electrically distinct groups of electrode plates, and a terminal means for each group, said terminal means connecting all of the electrode plates of one group to form an electrode of the capacitor unit and electrically communicating the electrode outwardly of said body; the improvement wherein there is a recess formed in said body transversely of said layers and spaced inwardly of the edges of said body for each of said groups, said recesses extending through all of the electrode plates of their respective group, and in which each of said terminal means comprises an electrically conductive lining in a recess for electrically connecting all of the electrode plates of one group for forming one of the electrodes of the capacitor unit and an electrically conductive terminal lead means having an upset inner end extending into said body substantially parallel to said layers and ending in its respective recess, said terminal lead means being electrically connected to said electrically conductive lining for communicating the electrode outwardly of the body, said body being shrunk upon said terminal lead means for gripping the same so that said upset inner end interlocks with said body.

5. In a capacitor unit comprising a laminated body of parallel layers bonded together throughout their coextensive surfaces, said layers including a plurality of dielectric layers and at least two electrically conductive layers lying wholly within said body, said electrically conductive layers being separated by at least one of said dielectric layers and forming two electrically distinct groups of electrode plates, and a terminal means for each group, said terminal means connecting all of the electrode plates of one group to form an electrode of the capacitor unit and electrically communicating the electrode outwardly of said body; the improvement in which said terminal means comprises electrically conductive means extending through at least some of said layers transversely thereto and spaced inwardly of the edges of said body for electrically connecting all of the electrode plates of one group for forming one of the electrodes of the capacitor unit and an electrically conductive substantially tubular terminal lead means extending into said body substantially parallel to said layers and electrically connected to said electrically conductive means for communicating the electrode outwardly of the body, said tubular terminal lead means having an integral tongue portion at the inner end thereof projecting outwardly of the periphery of the terminal lead means, said body being shrunk upon said terminal lead means for gripping the same so that said tongue portion interlocks with said body.

6. In a capacitor unit comprising a laminated body of parallel layers bonded together throughout their coextensive surfaces, said layers including a plurality of dielectric layers and at least two electrically conductive layers lying wholly within said body, said electrically conductive layers being separated by at least one of said dielectric layers and forming two electrically distinct groups of electrode plates, and a terminal means for each group, said terminal means connecting all of the electrode plates of one group to form an electrode of the capacitor unit and electrically communicating the electrode outwardly of said body; the improvement wherein there is a recess formed in said body spaced inwardly of the edges thereof for each of said groups, said recesses extending transversely through at least all of the electrically conductive layers of their respective groups, and in which each of said terminal means comprises an electrically conductive lining in one of the recesses for electrically connecting all of the electrode plates of one group for forming one of the electrodes of the capacitor unit and an electrically conductive lead wire having an enlarged inner end extending into said body substantially parallel to said layers and normal to its respective recess, said enlarged inner end being disposed in the recess and electrically connected to said electrically conductive lining for communicating the electrode outwardly of the body, said body being shrunk upon said lead wire for gripping the same so that said enlarged inner end interlocks with said body.

7. In the method of making an electrical unit which comprises building a body by forming a succession of superposed parallel layers of material, said layers including at least two electrically conductive layers lying wholly within said body and a plurality of layers having different specific electrical properties, said layers each being of a semi-hard consistency, said electrically conductive layers being separated by at least one of said layers having said different specific electrical properties and forming two electrically distinct groups, electrically connecting all of the electrically conductive layers in each group to form opposed electrodes of the electrical unit and electrically communicating the opposed electrodes outwardly of the body; the steps of inserting an electrically conductive means for each group of electrically conductive layers into the body transversely to the layers and spaced inwardly of the edges of said body for electrically connecting all of the electrically conductive layers in each group to form opposed electrodes of the electrical unit, inserting a terminal lead member having an upset inner end into the body substantially parallel to the layers and normal to said electrically conductive means for each of said electrodes so that there is electrical contact between said lead member and the electrically conductive means, and then curing said body to harden said layers and shrink them upon said lead members so that the upset inner ends thereof interlock with said body.

8. The invention as defined in claim 7 wherein the step of inserting the electrically conductive means into the body comprises forming a recess in the body transversely of the layers and spaced inwardly of the edges of said body and through at least the electrically conductive layers of one group, and lining the recess with electrically conductive material, said lining being in electrical contact with all of the electrically conductive layers of the group for forming a single electrode of the unit.

9. The invention as defined in claim 8 wherein the step of inserting the terminal lead member into the body comprises forming a separate recess in the body extending substantially parallel to said layers and opening into one of said first recesses, and positioning a terminal lead member in the second recess with the upset inner end disposed in the respective first recess and in electrical contact with the lining whereby, on curing the body, the layers shrink upon the lead member in the second recess for gripping the same and locking the upset inner end in the first recess.

10. In the method of making a capacitor unit which comprises building a body by forming a succession of superposed layers of material having specific electrical properties, said layers including a plurality of dielectric layers and at least two electrically conductive layers lying wholly within said body, said layers each being of a semi-hard consistency, said electrically conductive layers being separated by at least one of said dielectric layers and forming two electrically distinct groups of electrode plates, electrically connecting all of the electrode plates in each group to form opposed electrodes of the capacitor unit and electrically communicating the opposed electrodes outwardly of the body; the steps of forming a recess in the body spaced inwardly of the edges thereof for each group of capacitor plates, said recesses each extending into the body transversely to said layers thereof and passing through only the electrically conductive layers of its respective group, forming a second recess in the body for each group of capacitor plates normal to the respective first recesses, said second recesses extending into the body substantially parallel to said layers and opening into the respective first recesses, filling the first recesses with electrically conductive material for lining said recesses and electrically connecting all of the electrode plates in each group to form opposed electrodes of the capacitor unit, inserting a terminal lead member having an upset inner end into each of the second recesses so that there is electrical contact between said lead member and the electrically conductive lining in the respective first recess, said upset inner end being disposed in said electrically conductive material filling its respective first recess, and then curing said body to harden said layers and shrink them upon said lead members so that the upset inner ends thereof interlock with said body.

11. In the method of making a capacitor unit which comprises building a body by forming a succession of superposed layers of material having specific electrical properties, said layers including a plurality of dielectric layers and at least two electrically conductive layers lying wholly within said body, said layers each being of a semi-hard consistency, said electrically conductive layers being separated by at least one of said dielectric layers and forming two electrically distinct groups of electrode plates, electrically connecting all of the electrode plates in each group to form opposed electrodes of the capacitor unit and electrically communicating the opposed electrodes outwardly of the body; the steps of forming a recess in the body spaced inwardly of the edges thereof for each group of capacitor plates, said recesses each extending into the body transversely to said layers thereof and passing through only the electrically conductive layers of its respective group, forming a second recess in the body for each group of capacitor plates normal to the respective first recesses, said second recesses extending into the body substantially parallel to said layers and opening into the respective first recesses, lining the first recesses with electrically conductive material for electrically connecting all of the electrode plates in each group to form opposed electrodes of the capacitor unit, inserting a terminal lead member having an enlarged inner end into each of the second recesses, said enlarged inner ends having a diameter substantially equal to the diameter of their respective second recess and being disposed in the respective first recess so that there is electrical contact between the lead member and the electrically conductive lining in the first recess, and then curing said body to harden said layers and shrink them upon said lead members in the area of the second recesses so that the enlarged inner ends thereof are locked in the respective first recesses.

12. In the method of making a capacitor unit which comprises building a body by forming a succession of superposed layers of material having specific electrical properties, said layers including a plurality of dielectric layers and at least two electrically conductive layers lying wholly within said body, said layers each being of a semi-hard consistency, said electrically conductive layers being separated by at least one of said dielectric layers and forming two electrically distinct groups of electrode plates, electrically connecting all of the electrode plates in each group to form opposed electrodes of the capacitor unit and electrically communicating the opposed electrodes outwardly of the body; the steps of forming a recess in the body spaced inwardly of the edges thereof for each group of capacitor plates, said recesses each extending into the body transversely to said layers thereof and passing through only the electrically conductive layers of its respective group, forming a second recess in the body for each group of capacitor plates normal to the respective first recesses, said second recesses extending into the body substantially parallel to said layers and opening into the respective first recesses, lining the first recesses with electrically conductive material for electrically connecting all of the electrode plates in each group to form opposed electrodes of the capacitor unit, inserting a tubular lead member having an integral longitudinally extending tongue portion at the inner end thereof into each of the second recesses so that the tongue portion is disposed in the respective first recess, bending the tongue portions to project substantially normal to their lead members and into electrical engagement with the respective linings, and then curing said body to harden said layers and shrink them upon said lead members so that the tongue portions thereof interlock with said body.

References Cited by the Examiner

UNITED STATES PATENTS

| | | | |
|---|---|---|---|
| 1,865,046 | 6/32 | Priess | 317—261 |
| 2,389,018 | 11/45 | Ballard | 317—261 |
| 2,413,539 | 12/46 | Ballard | 317—261 |
| 2,745,048 | 5/56 | Schick | 317—261 |
| 3,021,589 | 2/62 | Weller | 317—242 |
| 3,040,415 | 6/62 | Rayburn | 317—260 |

LARAMIE E. ASKIN, *Primary Examiner.*

DARRELL L. CLAY, JOHN F. BURNS, *Examiners.*